Jan. 21, 1969 L. GREGORY, JR 3,422,776
MONITOR MEANS AND COUNTER MECHANISM FOR USE WITH SEED
PLANTERS AND THE LIKE
Filed Jan. 4, 1967 Sheet 3 of 5

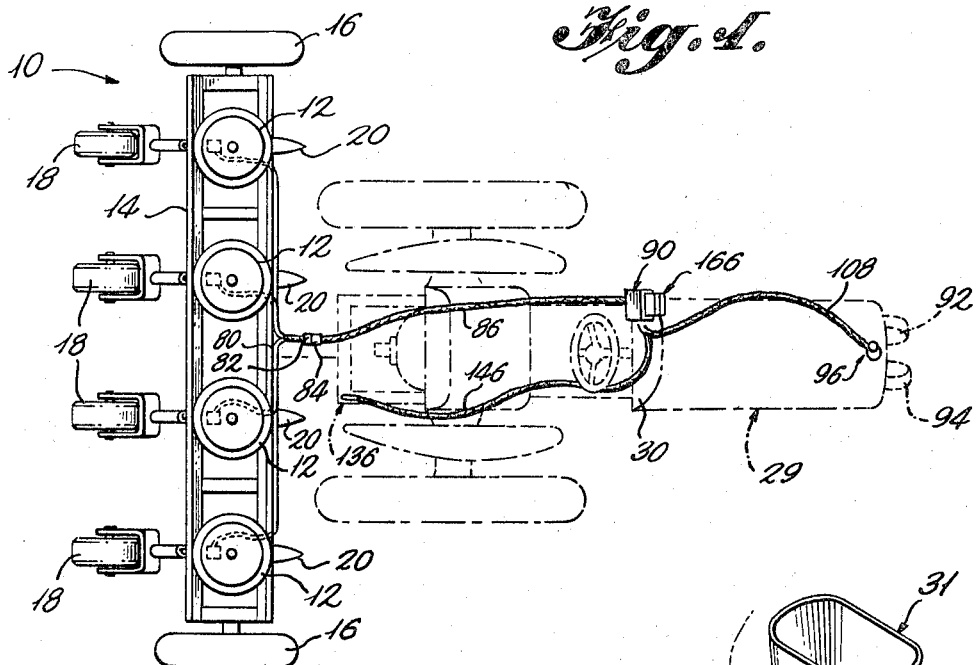
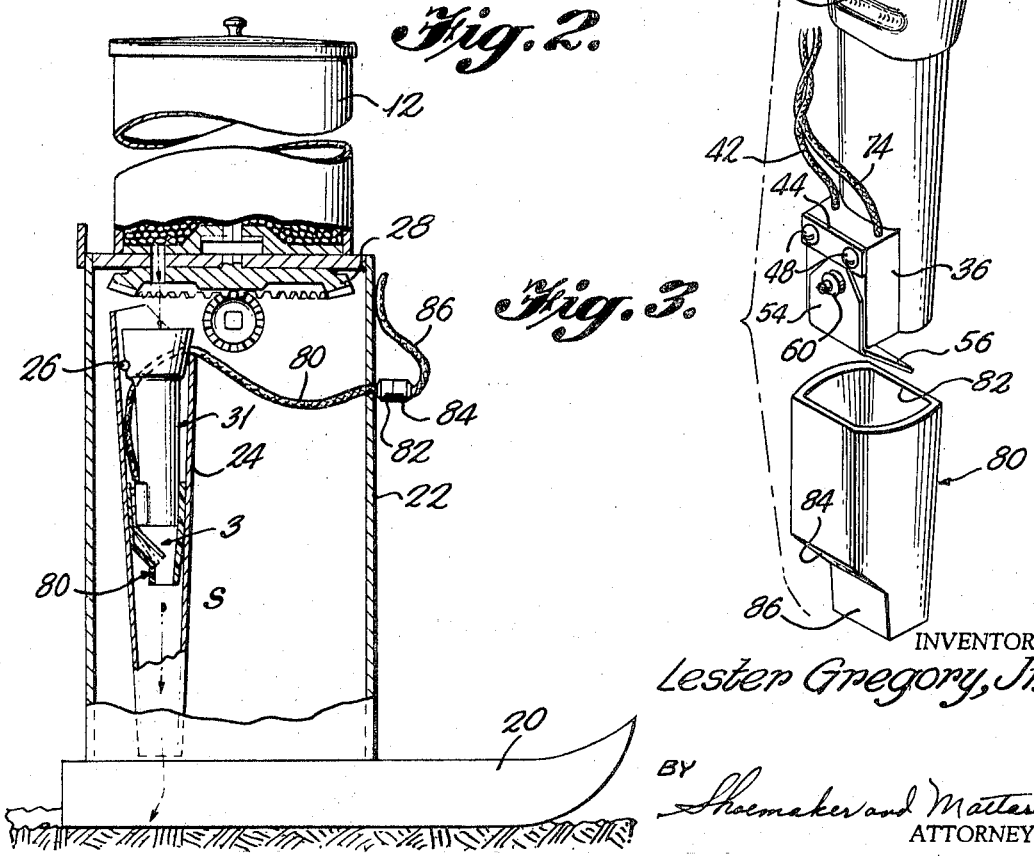

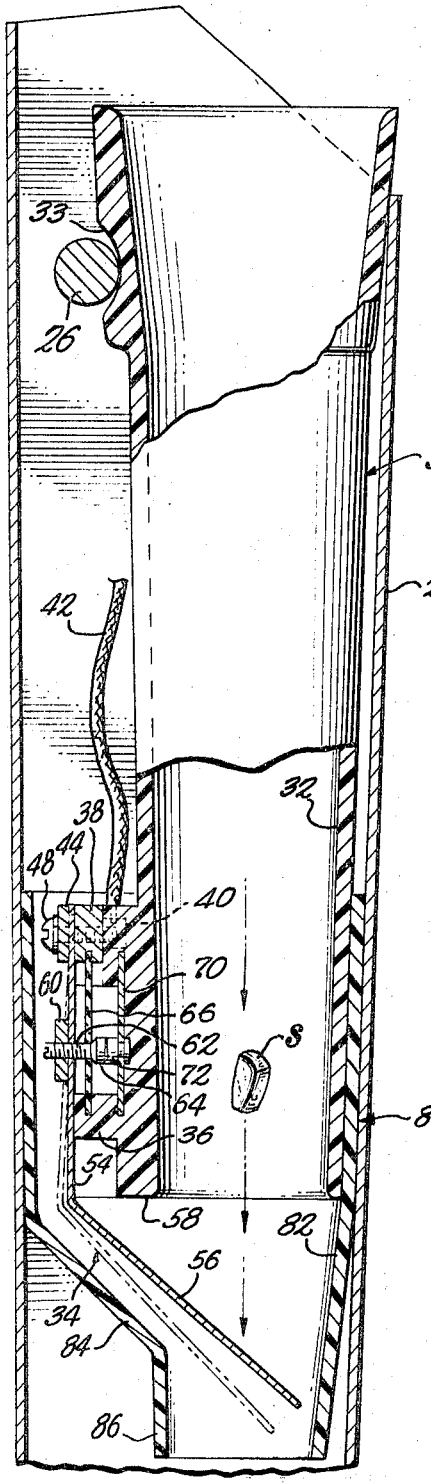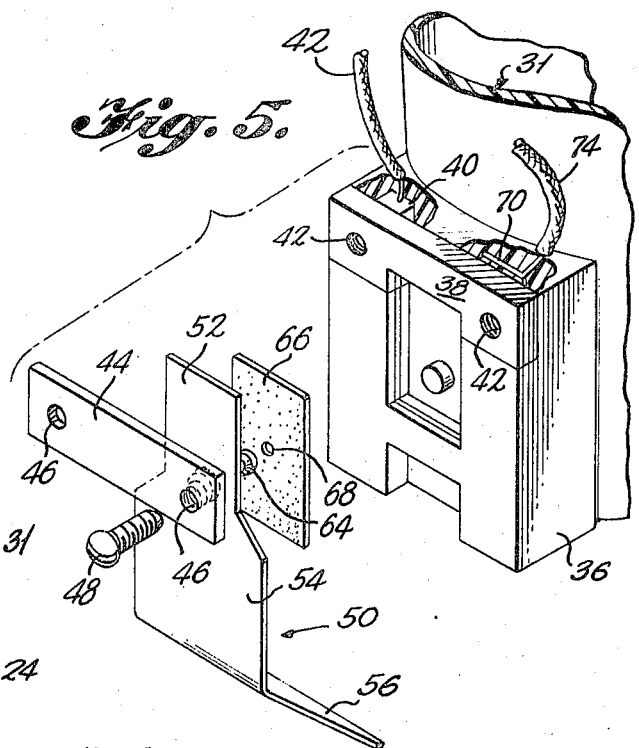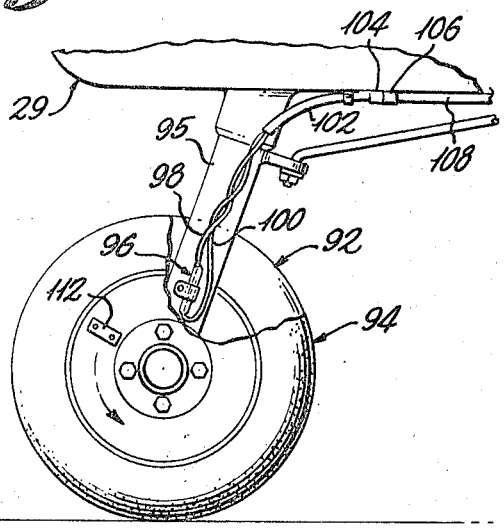

INVENTOR
Lester Gregory, Jr.

BY Shoemaker and Mattare
ATTORNEYS

INVENTOR
Lester Gregory, Jr.
BY Shoemaker and Mattare
ATTORNEYS

Jan. 21, 1969   L. GREGORY, JR   3,422,776
MONITOR MEANS AND COUNTER MECHANISM FOR USE WITH SEED
PLANTERS AND THE LIKE
Filed Jan. 4, 1967
Fig. 12.
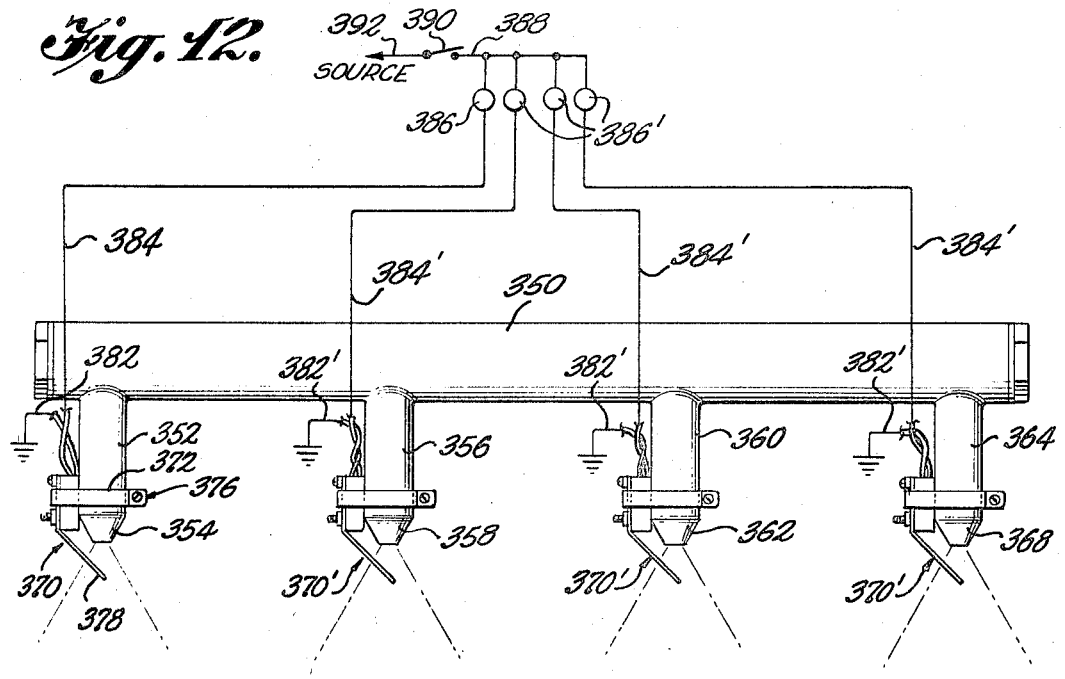
Fig. 13.
Fig. 14.
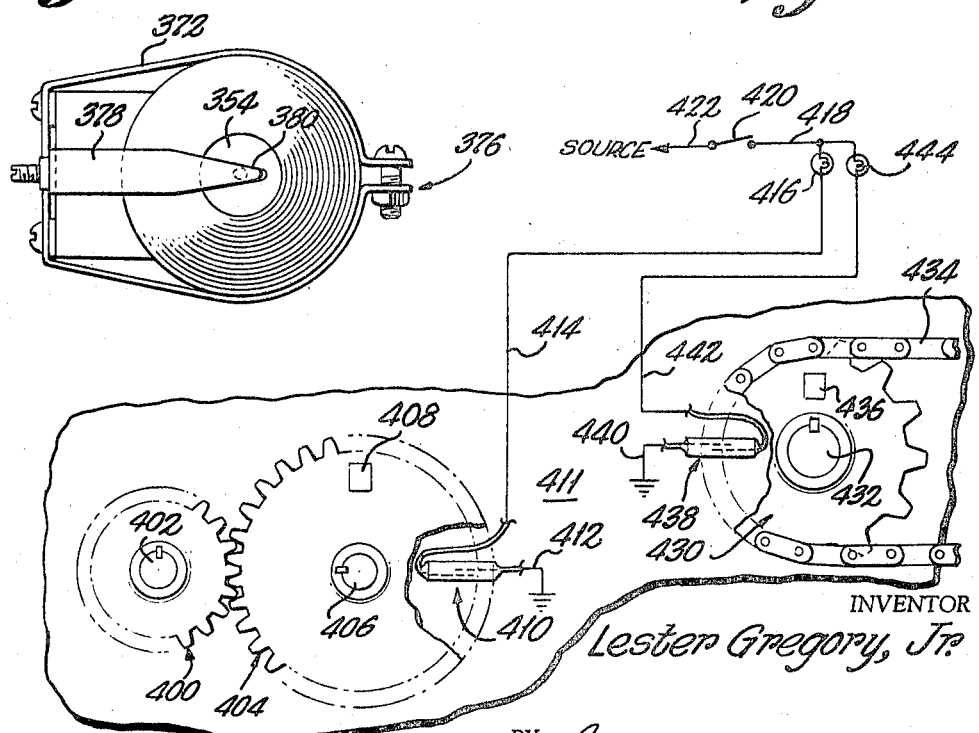
INVENTOR
Lester Gregory, Jr.
BY Shoemaker and Mattare
ATTORNEYS

United States Patent Office

3,422,776
Patented Jan. 21, 1969

3,422,776
MONITOR MEANS AND COUNTER MECHANISM FOR USE WITH SEED PLANTERS AND THE LIKE
Lester Gregory, Jr., Yellville, Ark. 72687
Filed Jan. 4, 1967, Ser. No. 607,293
U.S. Cl. 111—51                    8 Claims
Int. Cl. A01c 7/18

ABSTRACT OF THE DISCLOSURE

A mobile vehicle tows the feed mechanism over a field. A plurality of similar feed devices drop individual seeds downwardly through dispensing chutes. A seed actuated switch means is disposed in each chute to be actuated by a seed dropping therethrough. Seed feed indicating lamps are connected with the seed actuated switches to provide a visual monitoring of the seed feed. Seed counter means is also connected with one of said seed actuated switch means to count the number of seeds dropping through the associated dispensing chute. A distance indicating means comprises a down counter means controlled by a magnetic sensitive switch means which is operated by a magnet mounted on a wheel of the vehicle so that the distance the vehicle has traveled may be measured and indicated. A pivotally mounted portion on the vehicle has a position sensitive switch means thereon which is connected in series with the magnetic sensitive switch to control the operation of the distance indicating means. A control switch means is provided for connecting or disconnecting the seed counting means in the associated electrical network. A spray monitor system includes spray dispensing means, switch means adapted to be actuated by spray emanating from the dispensing means, and an electrical network including indicating lamps connected with said switch means so as to provide a visible indication of the presence or absence of spray. A further monitor system includes two movable parts one of which has a magnetic sensitive switch thereon and the other of which has magnetic means thereon for actuating the magnetic sensitive switch upon relative movement of the parts, the magnetic sensitive switch being connected in an electrical circuit including lamp means for providing a visual indication of the presence or absence of relative movement between the parts.

The present invention is an improvement of copending U.S. patent application Ser. No. 486,938 which is directed to Seed Planter Feeding Indicator and Counting Mechanism.

As set forth in the aforementioned copending patent application, a problem has arisen in the prior art due to the fact that the operator of a seed planter cannot continually monitor the apparatus to see that individual seeds are being deposited in the desired rows without continually looking back of the vehicle which is undesirable. Additionally, the operator of such a seed planter could not determine the number of seeds being dispensed. The aforementioned patent application discloses an improvement wherein the feed of the seeds is monitored and further wherein the number of seeds dispensed is counted.

In the present invention, additional means is provided for not only monitoring the feed of the seeds and counting the number of seeds dispensed, but also indicating the distance traversed by the planter mechanism. When the distance traversed as well as the number of seeds dispensed is known, the operator can readily determine whether or not a proper rate of feed is being obtained. In a typical example, a seed planter may be adjusted for planting a population of 22,000 seeds to an acre of ground in which case the seeds would be deposited at a spacing of approximately 7 inches from one another thereby depositing approximately 220 seeds for every 131 feet of travel of the planter. The present invention enables the operator to accurately check that the desired feed is obtained.

The present invention provides an arrangement which enables an operator to selectively indicate the distance traversed by the fed means, to indicate the number of seeds fed by the feed means, or to simultaneously measure the distance traversed and the number of seeds fed by the feed means. This last-mentioned mode of operation of the present invention is particularly advantageous since the electrical network including the counter means for the seed counting means and the distance indicating means is so arranged that upon tranversing the predetermined distance, each of these individual counter means will be automatically disconnected so that the operator need not carefully watch these counter means and can readily determine whether an accurate rate of feed is being obtained even if the feed means should traverse more than the predetermined distance over which it is desired to measure the number of seeds fed by the feed means. At the same time, the feed indicating means is adapted to provide a continuous indication of the feed of seeds through the dispensing chutes of the feed means.

An object of the present invention is to provide monitor means and counter mechanism in conjunction with a seed planter which can be selectively controlled so as to either count the number of seeds fed, indicate the distance traversed by the planter, or perform both of such functions simultaneously, while continuously monitoring the feed of seeds from the feed means.

Another object of the invention is to provide monitor means and counter mechanism in conjunction with a seed planter which is adapted to measure the number of seeds dispensed and to indicate the distance traversed, and which automatically shuts off both the seed counting means and the distance indicating means after a predetermined distance has been traversed.

A further object of the invention is to provide monitor means for monitoring movement at a remote location.

Other objects and many attendant advantages of the invention will become more apparent when considered in connection with the specification and accompanying drawings, wherein:

FIG. 1 is a top view of a simplified form of a 4-row, pull type seed planter connected with a mobile vehicle such as a tractor shown in phantom line and illustrating the electrical connections between certain components thereof;

FIG' 2 is a vertical section taken through one of the seed feeding mechanisms of the planter;

FIG. 3 is a top perspective exploded view of a portion of the components shown in FIG. 2;

FIG. 4 is an enlarged vertical section of a portion of the structure shown in FIG. 2 illustrating the details of the seed actuated switch means;

FIG. 5 is a top perspective exploded view of the seed actuated switch means shown in FIG. 4;

FIG. 6 is a side view partly broken away illustrating a wheel of the tractor having a magnetic sensitive switch associated therewith;

FIG. 12 is an illustration of a spray monitor system according to the present invention;

FIG. 13 is a bottom view of one of the spray dispensing units shown in FIG. 12 with the associated switch means; and FIG. 14 is a somewhat schematic illustration of a further monitor system according to the present invention.

Figure 7:
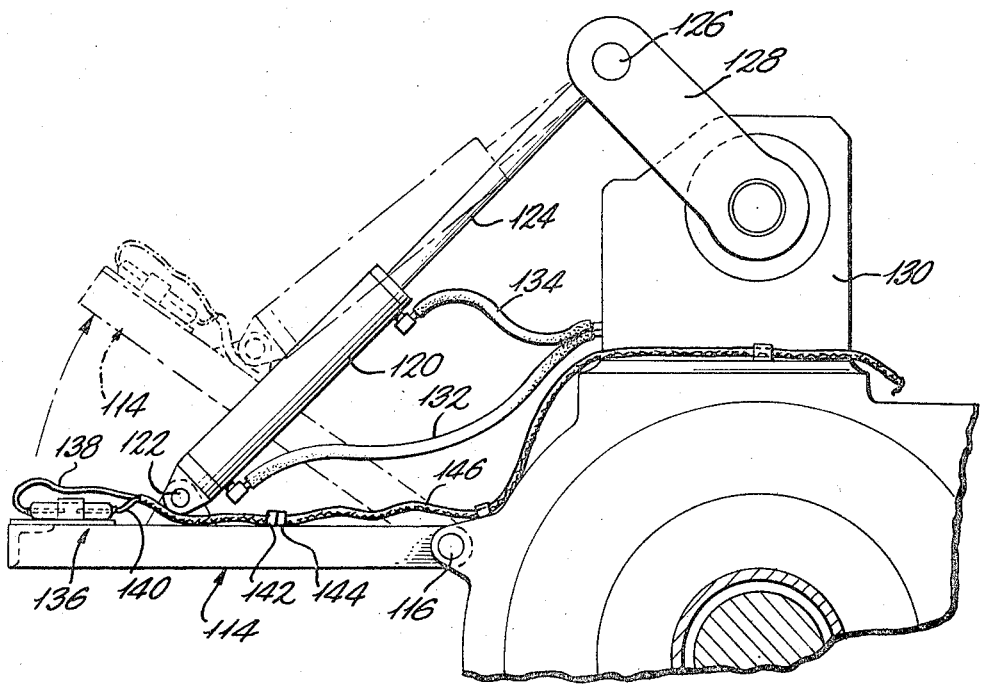
FIG. 7 is a side view of a portion of the tractor structure.

Referring now more particularly to the drawings, the numeral 10, in FIG. 1, generally designates a seed planter which is illustrated in simplified form. This simplified illustration of the planter may represent any type or make of planter having the hereinafter referred to structural features with which the elements of the present invention may be used. Accordingly, it is understood that in this illustration, which shows in top plan four seed hoppers 12, no limitation of the type of seed planter with which the present invention may be used, is to be understood. The planter shown may represent a four-row, pull type corn planter of the hilldrop and drill type or any other type of planter adapted for the planting of corn, beetroot seed or other seed capable of activating the circuitry of the invention. The invention is also applicable to planters having a greater or lesser number of seed hoppers than here illustrated in the simplified showing.

In the simplified planter structure shown, the numeral 14 generally designates the hopper supporting frame carried by wheels 16 while the numeral 18 designates a press wheel associated with and trailing each of the hoppers and the associated furrow openers 20.

Below each hopper 12 and extending from the frame 14 downwardly to the opener 20, there is illustrated a conventional boot 22. Within the boot is located the seed dispensing chute 24 which is supported or suspended by a suitable means, in some instances in certain types of machines, by means of a pin or bolt extending transversely through the boot and through the upper end of the chute as illustrated, such pin here being designated 26.

The numeral 28 generally designates a conventional simplified form of rotary seed feeder by means of which seeds are dropped individually into the upper end of the chute 24 in the manner illustrated. Such seed feeders are generally constructed to feed seeds of different sizes and at different rates. No detailed illustration or description of the seed feeder mechanism, other than that here shown in simplified form, is set forth since the seed feeding mechanism forms no part in itself of the present invention, but is merely illustrated to show the operative location of the seed actuated circuitry with respect thereto.

The numeral 29 generally designates a draft vehicle, such as a tractor, by which the planter machine may be drawn. Such vehicle is here illustrated as having an instrument panel 30 upon which units of the present invention may be mounted.

As seen in FIGS. 2 and 4, a tubular member 31 open at both ends is inserted within each of the dispensing chutes 24 of the various feed means. The inner bore 32 of insert 31 tapers in a downward direction as seen most clearly in FIG. 4 and the upper end portion of the insert which is of greater thickness than the remaining portion of the insert is provided with a groove 33 in the outer surface thereof. This groove 33 fits about pin 26 of the associated dispensing chute for holding the insert in the operative position illustrated and permitting ready mounting and dismounting of the insert when desired. It will be understood that the insert is so positioned beneath the associated feed means as to receive seeds dropping downwardly through the associated dispensing chute. A seed actuated switch indicated generally by reference numeral 34 is operatively associated with each of the inserts mounted within an associated dispensing chute. The construction of each of these seed actuated switch means is substantially identical, and the description of one such switch means will suffice.

The specific construction of the seed actuated switch means is illustrated in FIGS. 4 and 5, and as seen in these figures, the insert 31 is formed of a suitable electrical insulating material such as plastic or the like and is provided with a lateral projecting portion 36 upon which may be supported or molded in place an electrically conductive member 38 having a block portion 40 extending from one face thereof and operatively connected with one end of an electrical lead 42.

Member 38 is provided with a pair of threaded holes 42. A clamping bar 44 is provided with a pair of threaded holes 46 formed therethrough adapted to receive screws 48 which extend through holes 46 in the clamping bar and are threaded into the holes 42 of member 38.

The switch includes an elongated flexible metallic member indicated generally by reference numeral 50 having a reduced upper end portion 52 which is adapted to be clamped between the clamping bar 44 and member 38 whereby the upper end of member 50 is electrically connected with lead 42. Flexible member 50 includes an enlarged intermediate portion 54 which joins with a lower portion 56 extending downwardly therefrom at an oblique angle thereto. The lower portion 56 of member 50 as seen in FIG. 4 is disposed beneath the lower portion 58 of insert 31 so that a seed indicated by reference character S falling downwardly through the dispensing chute 24 and insert 31 will impinge upon the lower portion 56 of member 50 so as to move it from the normal full line position into the dotted line position indicated in this figure. It will be understood that flexible member 50 is of such thickness and dimension so as to be readily flexed by the weight of the dispensed articles.

The upper portion of flexible member 50 is provided with a hole formed therethrough and a nut 60 is suitably secured as by soldering thereto, the hole in flexible member 50 and the nut 60 being adapted to receive the threaded shank portion 62 of a movable contact including an enlarged contact head 64. It is apparent that this arrangement enables the movable contact to be adjusted relative to flexible member 50.

A flexible dust guard 66 is provided with a central hole 68 adapted to fit snugly about the shank portion 62 of the movable contact, the peripheral portions of dust guard 66 being disposed within surrounding portions of projection 36 of the insert 31 and member 38. Both projection 36 and member 38 are provided with grooves for receiving such peripheral portions of the dust guard. The dust guard is formed of suitable material such as rubber or the like whereby it is sufficiently flexible so as not to interfere with movement of the movable contact, and yet at the same time ensures that a dust-free arrangement is provided so that dust or other foreign matter does not enter the space between the movable and fixed contact hereinafter described.

A flat plate 70 is suitably fixed in place as by being embedded within the material of projection 36, plate 70 being formed of electrically conductive material. A fixed contact 72 is secured to plate 70 and is adapted to engage the contact head 64 of the movable contact. As illustrated particularly in FIG. 4, the fixed and movable contacts are normally in engagement with one another so that the switch means is normally closed. As seen most clearly in FIG. 5, the upper end of plate 70 is operatively connected with a second electrical lead 74. It is noted that the members operatively connected with the fixed and movable contacts are insulated from one another with the arrangement illustrated, and the only electrical connection is provided between the enlarged contact head 64 of the movable contact and the fixed contact 72.

As seen most clearly in FIGS. 3 and 4, an insulating boot or jacket indicated generally by reference numeral 80 is provided for fitting about the lower end of insert 31 and the associated switch mechanism so as to effectively insulate the switch from the surrounding dispensing chute 24. Boot 80 is formed with a suitable electrical insulating material such as plastic or the like and has a bore 82 formed therethrough. The upper end of boot 80 is adapted to receive the lower end of the insert and the switch as seen most clearly in FIG. 4, and a sloping wall portion 84 of the boot is adapted to be disposed in spaced relation to the lower portion 56 of the switch means. The boot includes a lowermost tubular portion 86 of reduced dimension opening at the lower end thereof so as to permit a seed dropping through the apparatus to pass downwardly through the lower open end of the boot.

Figure 8:
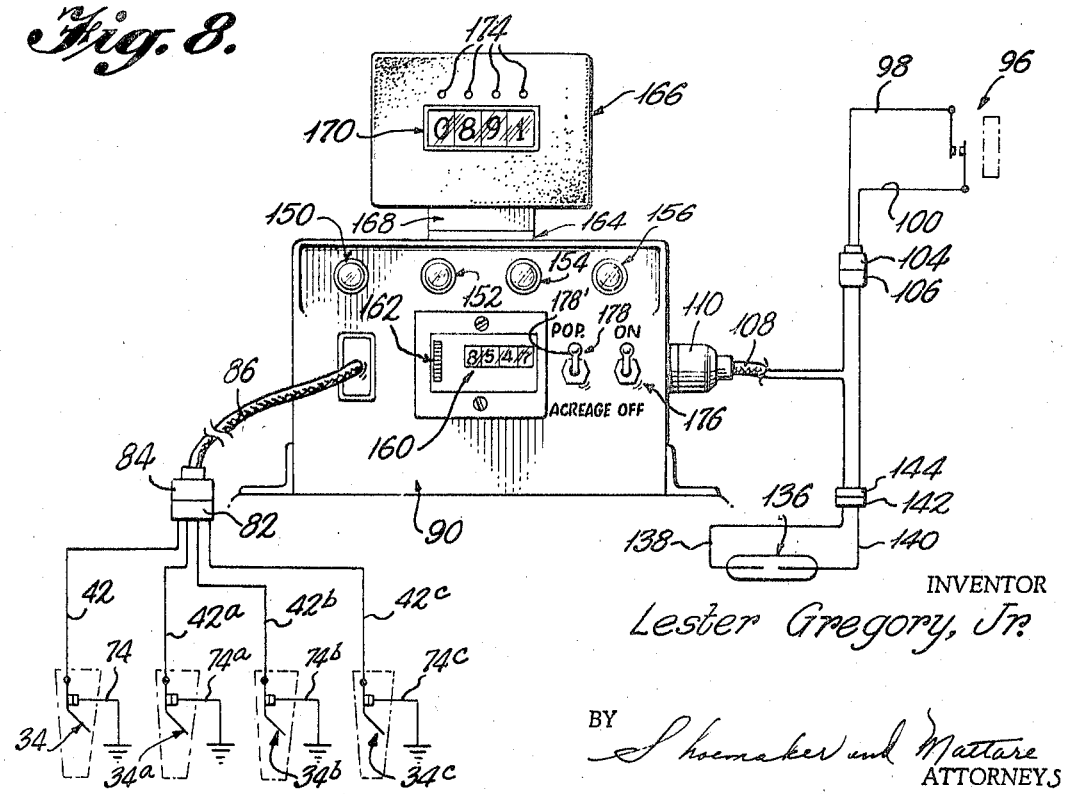
FIG. 8 is a somewhat schematic view illustrating a portion of the electrical circuit of the invention including the counter means associated therewith.

Referring again to FIG. 2, the leads 42 and 74 of each of the seed actuated switches is considered to be disposed within a cable indicated by reference numeral 80, it being understood that the leads from all of the different seed actuated switches may be incorporated in such cable having a plug 82 on the outer end thereof. This plug is adapted to be engaged with a socket 84 provided on the end of a cable 86 which in turn as seen in FIG. 8 illustrating in somewhat schematic form the connections of the parts is in turn connected with a housing 90 having certain electrical components of the monitoring and counter mechanism supported thereby.

Referring now particularly to FIG. 6, the forward end of tractor 29 is provided with a downwardly extending strut 95 having a pair of wheels 92 and 94 rotatably supported at the lower end thereof in a conventional manner. A magnetic sensitive switch means 96 is supported upon strut 95, this switch means being normally open and having a pair of leads 98 and 100 extending therefrom and disposed within a cable 102. This cable is connected with a plug 104 received in a socket 106 mounted at one end of a cable 108. The opposite end of this cable as indicated in FIG. 8 is connected with a plug 110 which is adapted to plug into a side of the housing 90 previously described.

Referring again to FIG. 6, a magnet 112 is mounted upon a portion of one or both of the wheels, this magnet being mounted so as to pass adjacent to the magnetic sensitive switch 96 once during every revolution of the associated wheel. Accordingly, as the wheel turns and the magnet 112 passes adjacent to switch means 96, the switch means 96 is periodically closed, each closure of this switch means representing one revolution of the wheel at the front of the tractor.

Referring now to FIG. 7 of the drawings, a framework or portion 114 is pivotally supported about a pivot axis 116 at the rear portion of the tractor. The portion 114 is illustrated in a substantially horizontal position as seen in FIG. 7 and is adapted to be lifted up into the phantom line position illustrated in this figure by a hydraulic mechanism including a hydraulic cylinder 120 pivotally connected at 122 with the portion 114. A piston is mounted within cylinder 120 and is connected with a piston rod 124 the outer end of which is pivotally connected at 126 to a portion 128 fixed upon a casing 130 supported at the rear of the tractor. Suitable hydraulic lines 132 and 134 are operatively connected with opposite ends of hydraulic cylinder 120 and with control means within casing 130 for selectively actuating the hydraulic operating means.

A position sensitive switch 136 may comprise a conventional mercury switch or magnetic switch and associated magnet which closes the circuit therethrough when disposed in the horizontal position illustrated in full lines, and which is adapted to open the circuit when the portion 114 is tilted upwardly into the phantom line position. A pair of leads 138 and 140 are connected with position sensitive switch 136. Leads 138 and 140 are in turn connected with a plug 142 adapted to be received within a socket 144 connected with a cable 146 which in turn is connected with the cable 108 previously described so as to be connected in turn with certain electrical components disposed within housing 90 as hereinafter described.

Referring now to FIG. 8, the housing 90 has mounted on the front face thereof four illuminable indicating lamps 150, 152, 154 and 156 connected in the electrical network hereinafter described. An up counter includes digit readout means indicated generally by reference numeral 160 and visible at the face of housing 90, a member 162 being accessible from the face of the housing for resetting the digits on the readout means of the counter when desired.

A socket portion 164 is provided at the upper end of the housing, a down counter being indicated generally by reference numeral 166, this down counter including a plug portion 168 adapted to plug into the socket portion 164. Down counter 166 includes a digit readout portion 170, and a plurality of holes 174 are provided in the face of the down counter for receiving a suitable instrument for resetting the digits of the readout means when desired.

Up counters or totalizing counters of various types may by used, and in a typical example a type E16 totalizing counter manufactured by Kessler-Ellis Products, Atlantic Highlands, N.J. may be employed. The down counter employed in the present invention may be for example type EVs15, plug-in model, manufactured by the same company.

The up or totalizing counter is adapted to count from zero upwardly when pulsed, whereas the down counter is adapted to count downwardly from a preset total when pulsed.

A first switch 176 mounted on the face of housing 90 comprises an on-off switch for the entire electrical circuit, and a second switch 178 is a double throw, four-pole switch hereinafter described for connecting the counters selectively into the circuit for different conditions of operation.

Figure 9:
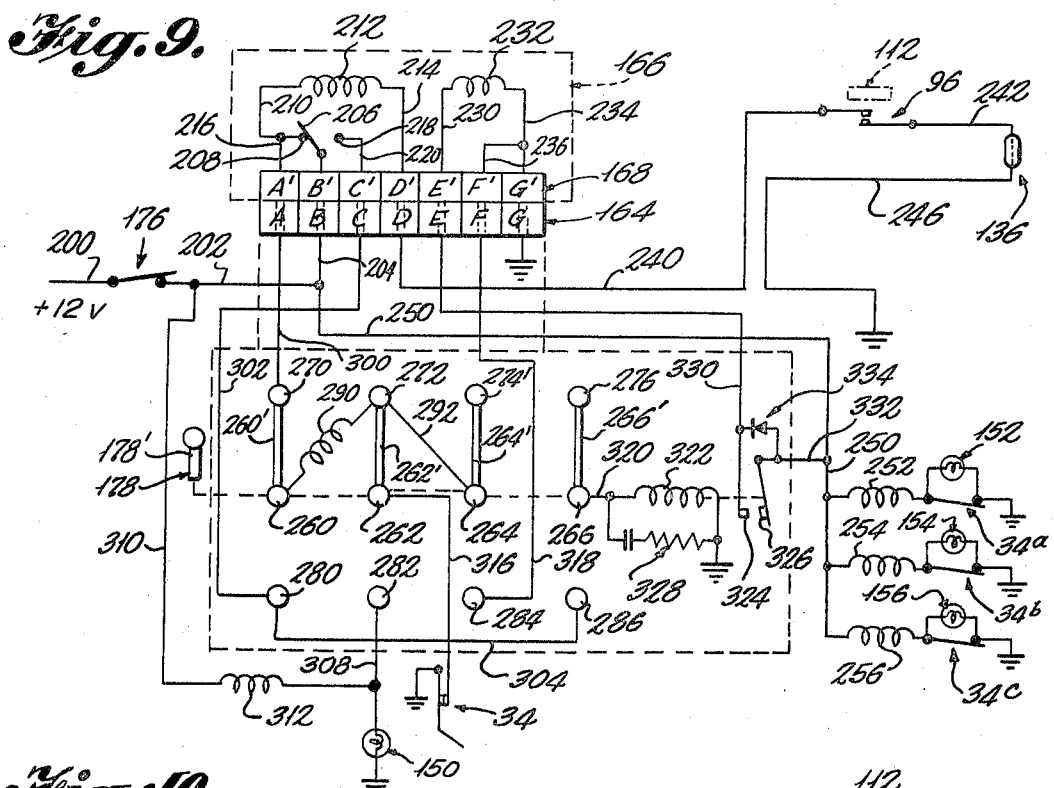
FIG. 9 is a schematic wiring diagram illustrating the electrical network of the present invention.

Referring now to FIG. 9, a schematic wiring diagram of the electrical system associated with the components previously described is illustrated. Those elements which have heretofore been described are identified with the same reference numerals in FIG. 9. A lead 200 is connected with a suitable source of electrical energy such as 12 volts normally provided on a tractor, the on-off switch 176 being adapted to close the circuit through a lead 202 which is connected through lead 204 with a first socket portion B of the socket 164 provided at the upper portion of the housing 90 previously described. Socket portion 164 includes sockets A, B, C, D, E, F and G. The plug portion 168 at the lower part of down counter 166 is provided with plug portions A', B', C', D', E', F' and G' adapted to fit within the corresponding socket portions as illustrated to provide an electrical connection therewith.

Plug portion B' is connected with a switch 206 shown in its normal position when the down counter has been preset and is ready to count, the switch then being in engagement with a contact 208 and through lead 210 with the down counter coil 212 the opposite side of which is connected by lead 214 with the plug portion D'. Lead 210 is also connected through a lead 216 with plug portion A'. Switch 206 is also adapted to be disengaged from contact 208 and to engage contact 218 which is connected through a lead with plug portion C'.

Plug portion E' is connected through lead 230 with a reset coil 232 adapted to move switch 206 into the position shown in FIG. 9. Reset coil 232 also moves the counter digit readout means into position. The opposite end of reset coil 232 is connected through lead 234 with the plug portion G'. A lead 236 also connects this opposite end of the reset coil with the plug portion F'.

The socket portion D is indicated as being connected by a lead 240 with one side of the magnetic sensitive switch 96 the opposite side of which is indicated as being connected by lead 242 with the position sensitive switch 136 which in turn is indicated as being connected with ground through a lead 246. It is noted that the connections are such that the magnetic sensitive switch and the position sensitive switch are connected in series with one another and with the coil 212 of the down counter means, these leads 240, 242 and 246 representing schematically the interconnections of the leads and cables previously described in connection with the magnetic sensitive switch and the position sensitive switch as well as the connections thereof within the housing 90.

The lead 204 is also connected with a lead 250 which in turn is connected through coils 252, 254 and 256 with the indicator lamps 152, 154 and 156 respectively as previously described. These lamps are in turn connected in parallel with seed actuated switch means 34a, 34b and 34c respectively which are identical with the seed actuated switch means 34 previously described and which are associated with the other three feed means of the seed planter.

Figure 10:
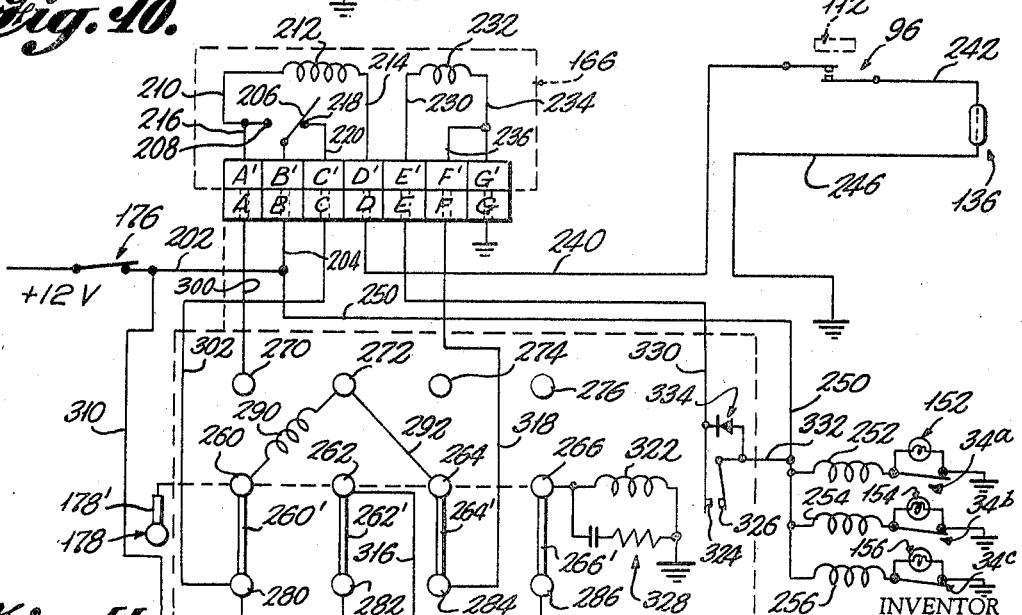
FIG. 10 is a view similar to FIG. 9 illustrating the switch means thereof in a different operative position.

The double throw, four-pole switch previously described includes an operating handle portion 178' and is operatively connected with the contacts 260, 262, 264 and 266 having switch portions 260', 262', 264' and 266' operatively connected therewith. When the switch is in the upper position as shown in FIG. 9, the switch portions 260', 262', 264' and 266' make contact with the contacts 270, 272, 274 and 276 respectively. When the switch is thrown into its opposite or lower position as shown in FIG. 10, the switch portions 260', 262', 264' and 266' make contact respectively with the contacts 280, 282, 284 and 286 respectively.

The contact 260 is permanently connected with contact 272 through the coil 290 of the up counter or totalizing counter previously described for counting the seeds dispensed by the associated planter. Contact 272 is in turn permanently connected with contact 264 by lead 292.

Contact 270 is connected with socket portion A by lead 300. Contact 280 is connected with socket portion C by lead 302. Contact 280 is further connected by lead 304 with contact 286.

Contact 282 is connected with indicating lamp 150 previously described by a lead 308. A lead 310 connects lead 308 with lead 202 previously described. A coil 312 is connected in lead 310.

Contact 262 is connected through lead 316 with the seed actuated switch means 34 previously described. Contact 284 is connected by lead 318 with the socket portion F.

Contact 266 is connected through lead 320 to the coil 322 of a relay including contacts 324 and 326. A time delay means 328 is connected in parallel with coil 322 so as to provide a predetermined time delay before the relay is released. The time delay afforded before the relay is released in the present invention may be on the order of 300 milliseconds.

Contact 324 of the relay is connected through lead 330 with the socket portion E, and contact 326 of the relay is connected through lead 332 with the lead 250 previously described. An arc suppressor 334 is connected between leads 330 and 332.

With switch 178 in the operative position shown in FIG. 9, the apparatus is adapted to count both the number of seeds dispensed by the apparatus as well as to count the number of revolutions of the front wheel of the tractor. When the circumference of the wheel is known, it is a simple matter to compute the number of revolutions of the wheel required to traverse a given distance. Furthermore, it is a simple matter to compute the number of seeds which should be dispensed by the apparatus for such a predetermined distance in order to obtain a certain population of seeds per acre. Accordingly, the down counter is first initially set for a certain predetermined number of revolutions of the front wheel of the tractor which will carry it a known distance. The readout means of the up counter for counting the seeds is set at zero. It is assumed that these conditions exist as shown in FIG. 9 and that the on/off switch 176 is closed. It will be noted that as seeds drop through the inserts in the various dispensing chutes, the seed actuated switch means 34a, 34b, and 34c will be operated so as to cause the indicator lamps 152, 154 and 156 to blink on and off thereby informing the operator that the seeds are being dispensed. It is apparent that each time one of these seed actuated switch means is opened by a seed, the associated indicating lamp will be illuminated.

The indicating lamp 150 will remain illuminated in this position of the control switch means 178.

The feed means operate in synchronized relation to one another, and accordingly each feed means dispenses a seed in unison with all the other feed means. Accordingly, the seed actuated switch means 34 is adapted to count the seeds passing through all of the feed means since in the present case each time switch means 34 opens, it represents four seeds being dispensed from the four individual feed means. Each time switch means 34 opens and closes, it will produce a pulse through the coil 290 of the seed counting means thereby serving to provide an accurate count of the seeds being dispensed.

With the circuit in the position shown in FIG. 9, as long as the position sensitive switch 136 is in position to close the circuit therethrough, each time the magnet 112 passes adjacent magnetic sensitive switch 96, this switch will be closed and then will open again after the magnet has passed the switch. Each time magnetic sensitive switch means 96 closes, a pulse passes through the coil 212 of the down counter, and the down counter starts to count downwardly.

After the down counter has counted to zero, the coil 212 thereof will cause switch 206 to move from the position shown in FIG. 9 away from contact 208 and into engagement with contact 218. Such movement of the switch 206 opens the circuit through both the coil 212 of the down counter means as well as the coil 290 of the seed counting means. If the operator should continue to operate the tractor, no changes will take place on the digital readout means of either the distance indicating means represented by the down counter or the seed counting means. The operator can then determine exactly how many seeds have been dispensed in a certain predetermined distance to thereby calculate whether or not the proper population of seeds is being obtained.

The circuit can again be reset to its initial position, the switch being capable of being manually reset to the position shown in FIG. 9, or it can be electrically reset by the reset coil as hereinafter described. The aforementioned cycle can be repeated as many times as desired.

Let us now assume that it is desired simply to measure and indicate the distance traversed by the apparatus without counting the number of seeds being dispensed. The control switch means 178 is then moved into the operative position shown in FIG. 10. It is assumed that the switch 206 is in the position shown in FIG. 10 in contact with the contact 218. Accordingly, a circuit is closed through contact 218, lead 220, lead 302, contact 280, lead 304, contact 286 and thence to the coil 322 of the reset relay. Relay contacts 324 and 326 are closed thereby closing the circuit through the reset coil 232 which causes switch 206 to move into engagement with the contact 208. After a predetermined time delay of approximately 300 milliseconds relay contacts 324 and 326 are opened.

While switch 206 is still in engagement with the contact 218 before the reset coil is energized, the circuit is also closed through coil 290 and lead 292 and thence through switch portion 264' and lead 318 as well as leads 236 and 234 to ground. This pulse passing through the totalizing counter 290 will indicate one count on the counter. This count does not in this case represent the amount of seeds fed, but actually indicates the number of cycles of the down counter as will hereinafter become more apparent.

In the position shown in FIG. 10, switch portion 262' closes the circuit through contact 282 and lead 316 to the seed actuated switch means 34. Whereas the indicating lamp 150 was continuously on in the position shown in FIG. 9, the indicating lamp 150 in the position shown in FIG. 10 will be affected by the opening and closing of seed actuated switch means 34 so as to provide a monitoring of the flow of seeds through the associated feed means. The arrangement is such that switch means 34 will tend to extinguish lamp 150 in the closed position, and when switch 34 opens the lamp will be illuminated so that the operator is advised that seeds are being fed through the associated feed means by noting the varying intensity of lamp 150.

It will of course also be noted that the indicating lamps 152, 154 and 156 will continuously monitor the flow of seeds through the associated feed means in the position shown in FIG. 10.

With the switch member 206 now in engagement with contact 208, the down counter is again positioned to be actuated by rotation of the wheel, and each time the magnetic sensitive switch 92 closes, a pulse will pass through coil 212 of the down counter to count downwardly. It is of course realized that the down counter will be preset before undertaking operation in the position shown in FIG. 10.

The down counter will continue to count downwardly until it reaches zero whereupon the switch 206 will again move to the position shown in full lines in FIG. 10. When the switch 206 moves into this position, the aforementioned cycle will start all over again wherein the circuit is closed through the reset relay which operates the reset coil to again move the switch back into engagement with contact 208, the reset relay opening after a predetermined time interval. The down counter will thereby be automatically reset so as to count down again from the predetermined setting thereof. At the same time, an additional count is registered on the totalizing counter due to the fact that an impulse passes through coil 290. It will thereby be recognized that the number of counts registered by the totalizing counter will indicate the number of cycles which have been completed by the down counter so that the total number of revolutions of the tractor wheel may be readily determined. This enables the operator to readily determine the distance traversed. It will of course be understood that anytime the inner portion of the tractor is elevated so as to open the sensitive position switch 136, the circuit will be interrupted so that no counting will occur in the down counter during such periods.

Figure 11:
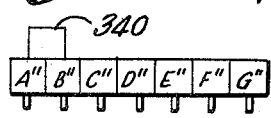
FIG. 11 is a somewhat schematic view illustrating a plug means for use in the electrical circuits shown in FIGS. 9 and 10.

Referring now to FIG. 11, a plug is illustrated including plug portion A″, B″, C″, D″, E″, F″ and G″. As indicated schematically, plug portions A″ and B″ are interconnected with one another through the intermediary of a lead 340. This plug may be substituted for the plug portion 168 of the down counter 166. In the instance where no down counter is employed, the plug serves to provide a weather seal for the socket portion 164, and further enables the apparatus to be used for counting seeds when the control switch means 178 is in the up position illustrated in FIG. 9.

Referring now to FIG. 12, a spray monitor system is illustrated. This system includes a manifold 350 having a suitable liquid under pressure disposed therewithin and adapted to be dispensed therefrom. This manifold may be mounted on any suitable means and includes conduit means 352 extending downwardly therefrom and having a spray nozzle 354 disposed at the lower end thereof. A similar conduit means 356 has a spray nozzle 358 disposed at the bottom thereof as does a conduit 360 having a spray conduit 362 at the lower end thereof. A further conduit 364 has a spray nozzle 368 at the lower end thereof.

The left-handmost conduit 352 as seen in FIG. 12 has switch means indicated generally by reference numeral 370 operatively associated therewith, this switch means being substantially identical with the switch means 34 previously described and including a flexible switch member 378 which extends downwardly beneath the spray nozzle so as to be impinged upon by the spray emanating from the nozzle.

As seen in FIG. 13, the outer end of the flexible member 378 tapers to a substantially reduced outer end portion as indicated at 380 so that the flexible switch portion will create only a minimum disturbance to the spray pattern of the spray emanating from the associated spray nozzle.

Switch means 370 is held in operative position with respect to the downwardly extending conduit 352 by a strap means 372 which is wrapped around the members and has the opposite ends thereof interconnected by a nut and bolt assembly 376.

Substantially identical switch means 370' is associated with each of the other conduits 356, 360 and 364, these switch means not being described in detail.

The left-handmost switch means 370 is connected with a first electrical lead which connects one side of the switch means with ground. The opposite side of the switch means is connected with a lead 384 which in turn is connected with an indicating lamp 386. The lamp 386 is connected with a lead 388 which in turn is connected with a switch means 390. Switch means 390 is connected by lead 392 with a suitable source of electrical energy.

In a similar manner, the switches 370' are connected by leads 382' with ground and are connected by leads 384' with indicating lamps 386'.

It is apparent that when the spray means is operating so that spray is emanating from the various spray nozzles, the switch means associated with each of the spray nozzles will be moved to its open position due to impingement of the spray upon the lower portion of the flexible switch member. This of course opens the circuit through the indicating lamps associated with each of the spray dispensing nozzles so that no visible indication will be provided. If for some reason or another, the spray should be interrupted in any one of the spray dispensing nozzles, the associated switch will close to thereby close the circuit through the associated indicating lamp whereby the lamp will be lit, of course assuming that switch 390 is closed. This system thereby provides a visual indication of the presence or absence of spray at a remote location.

Referring now to FIG. 14 of the drawings, a further monitoring system according to the present invention is illustrated. A first gear member 400 is mounted upon a shaft 402, and a second gear member 404 meshing with the first gear member is mounted upon a shaft 406. A magnet 408 is carried by gear 404. This magnet is adapted to move closely adjacent to a magnetic sensitive switch 410. One side of switch 410 is connected by lead 412 with ground, the opposite side of the switch being connected by lead 414 with an indicating lamp 416 which in turn is operatively connected with lead 418. Lead 418 is connected with a switch 420 which in turn is connected through a lead 422 with a suitable source of electrical energy.

When switch 420 is closed, each time magnet 408 passes adjacent the magnetic sensitive switch 410 which is mounted upon a fixed portion of a supporting structure 411, switch 410 is closed to thereby cause the indicating lamp 416 to be illuminated. As soon as the magnet passes, the magnetic sensitive switch 410 which is substantially identical with the magnetic sensitive switch previously described will again open. By observing indicating lamp 416, an operator may be advised that periodic blinking thereof will indicate that gear 404 is rotating relative to the fixed supporting structure 411.

A sprocket 430 is supported on the shaft 432 and is driven by a chain 434. Sprocket 430 has a magnet 436 disposed thereon which is adapted to pass adjacent to a magnetic sensitive switch 438 fixedly supported on the support structure 411.

One side of switch 438 is connected by lead 440 with ground, the opposite side of the switch being connected by lead 442 with an indicating lamp 444 which is in turn connected with the aforementioned lead 418.

By observing lamp 414, an operator can determine whether or not sprocket 430 is rotating relative to the fixed supporting structure 411 since each time magnet 436 passes switch 438, the switch will be closed thereby closing the circuit through the associated indicating lamp 444.

With the monitoring system shown in FIG. 14, an operator may readily be advised of relative movement between two parts at a remote location.

It is apparent from the foregoing that there is provided according to the present invention a monitor means and counter mechanism for use with a seed planter which is adapted to provide a substantially continuous monitoring of the passage of seeds through the dispensing means of the apparatus, and which further is adapted to count only the number of seeds dispensed, to count and indicate only the distance traveled by the apparatus in terms of revolutions of a wheel of the mobile vehicle associated with the apparatus, or to further count and indicate both the number of seeds dispensed as well as the distance traversed. Additionally, means is provided for automatically discontinuing the counting of revolutions of the wheel as well as seeds dispensed by the apparatus after a predetermined distance has been traversed. Monitor systems are also provided for monitoring movement at a remote location.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:
1. A seed planter monitor means and counter mechanism comprising a seed planter including feed means having a plurality of dispensing chutes, said monitor means and counter mechanism comprising an electrical network including a seed actuated switch means operatively associated with each of said dispensing chutes so as to be actuated by seeds passing downwardly through the associated dispensing chute, seed feed indicating means operatively connected with at least one of said seed actuated switch means to indicate the feed of seeds through the associated chute, seed counting means operatively connected with at least one of said seed actuated switch means for counting the number of seeds passing downwardly through the associated chute, and distance indicating means operatively connected with switch means for sensing movement of the feed means.

2. Apparatus as defined in claim 1 wherein said seed feed indicating means comprises illuminable lamp means, said seed counting means and said distance indicating means including digit readout means.

3. Apparatus as defined in claim 1 wherein said distance indicating means is operatively connected with magnetic sensitive switch means for sensing movement of the feed means.

4. Apparatus as defined in claim 3 including an additional position sensitive switch means connected in series with said magnetic sensitive switch means for controlling the operation of said distance indicating means.

5. Apparatus as defined in claim 1 wherein said distance indicating means comprises down counter means including an operating coil and a reset coil, means for operating said reset coil including a time delay relay mechanism.

6. Apparatus as defined in claim 1 including a mobile vehicle for moving said feed means over a field, said mobile vehicle being operatively connected with said feed means, said mobile vehicle including a rotatable wheel, said seed feed indicating means comprising illuminable lamp means positioned to be observed by an operator of said mobile vehicle, said seed counting means and said distance indicating means both being positioned to be observed by an operator of the vehicle, said distance indicating means including counter means, magnetically sensitive switch means operatively connected with said last-mentioned counter means to control the operation thereof, magnetic means on said rotatable wheel of the vehicle for operating said magnetic sensitive switch means whereby said distance indicating means counts revolutions of said wheel.

7. Apparatus as defined in claim 6 wherein said mobile vehicle includes a portion pivotally connected therewith, position sensitive switch means mounted on said last-mentioned portion, said position sensitive switch means being connected in series with said magnetic sensitive switch means for controlling the operation of said distance indicating means.

8. Apparatus as defined in claim 6 including control switch means for alternately connecting said distance indicating means in said electrical network or out of said electrical network so that the counter mechanism is adapted to either count only revolutions of said wheel or alternatively to count both revolutions of said wheel and the number of seeds passing downwardly through a dispensing chute.

References Cited
UNITED STATES PATENTS

| | | | |
|---|---|---|---|
| 2,914,246 | 11/1959 | Beamish | 235—98 |
| 3,355,102 | 11/1967 | Gregory | 235—98 |

ROBERT E. BAGWILL, *Primary Examiner.*

U.S. Cl. X.R.

111—1; 235—95, 98